United States Patent [19]

Cunha

[11] Patent Number: 5,000,501
[45] Date of Patent: Mar. 19, 1991

[54] VEHICLE BODY PANEL

[76] Inventor: Edward Cunha, 732 Costa Dr., Lodi, Calif. 95240

[21] Appl. No.: 481,165

[22] Filed: Feb. 20, 1990

[51] Int. Cl.$^5$ ............................................. B62D 25/00
[52] U.S. Cl. ..................................... 296/1.1; 296/195; 296/196; 29/401.1
[58] Field of Search .................. 296/1.1, 196, 195, 10; 29/401.1

[56] References Cited

U.S. PATENT DOCUMENTS

| | | | |
|---|---|---|---|
| 3,338,617 | 8/1967 | Lockwood | 296/1.1 |
| 4,121,870 | 10/1978 | Oakey | 296/120.1 |
| 4,514,891 | 5/1985 | Draper | 296/107 |
| 4,679,847 | 7/1987 | Dirck | 296/218 |
| 4,708,389 | 11/1987 | Maebayashi et al. | 29/401.1 |
| 4,746,163 | 5/1988 | Muscat | 296/218 |
| 4,842,326 | 6/1989 | DiVito | 296/196 |

Primary Examiner—Robert R. Song
Attorney, Agent, or Firm—Jerry T. Kearns

[57] ABSTRACT

A vehicle body panel is utilized to convert the large, rounded rear window of 1984-1989 Chevrolet Corvettes to a flat rear deck configuration. The replacement body panel is preferably formed from a molded fiberglass material and includes a generally horizontal rear deck portion having generally vertical side walls. Rear wheel wells are formed in the side walls and a rear roof portion extends upwardly from the deck. A generally trapezoidal planar rear window is provided in a back wall of the rear roof portion. Apertured flanges are provided on a back end on rear sidewall bottom edges of the body panel for securement to the original vehicle. A U-shaped strip is formed on a forward edge of the rear roof portion and forms a channel for weatherstripping which forms a seat for engagement with top and side portions of the original vehicle body panels. The original rear valance panel of the vehicle, including the original brake and signal lights, are secured to the rear end of the replacement panel.

8 Claims, 3 Drawing Sheets

VEHICLE BODY PANEL

BACKGROUND OF THE INVENTION

1. Field of the Invention

The present invention relates to vehicle body panels, and more particularly pertains to a replacement vehicle body panel for converting a rounded rear window of a rear hatch type body to a more attractive horizontal deck configuration.

2. Description of the Prior Art

Various types of vehicle body panels are known in the prior art. A typical example of such a vehicle body panel is to be found in U.S. Pat. No. 4,121,870, which issued to E. Oakey on Oct. 24, 1978. This patent discloses a removable transparent roof panel adapted to be installed in an opening provided in a portion of a motor vehicle roof structure. U.S. Pat. No. 4,514,891, which issued to D. Draper on May 7, 1985, discloses a method of converting a sedan type vehicle body to a convertible or targa type vehicle body. U.S. Pat. No. 4,679,847, which issued to R. Dirck on July 14, 1987, discloses a removable top for a pick-up truck formed from a lightweight transparent material which covers a top opening and a rear opening of the vehicle cab. U.S. Pat. No. 4,708,389, which issued to J. Maebayashi et al on Nov. 24, 1987, discloses an open top automobile body having a hoop member which is mounted for swinging movement between an erected position and a retracted position. A rigid roof panel is removably mounted to extend between the front windshield and the hoop member. U.S. Pat. No. 4,746,163, which issued to P. Muscat on May 24, 1988, discloses a convertible top system for automobiles which includes a rear convertible frame extending partially over the passenger compartment when raised, and a removable roof panel which may be placed between the windshield frame and the forward main bow of the rear convertible frame. The system allows either a fully or partially open top configuration for automobiles.

While the above mentioned devices are directed to vehicle body panels, none of these devices disclose a replacement vehicle body panel and a method of converting a rounded rear window and roof portion of a rear hatch type vehicle body to a more attractive horizontal rear deck configuration. Inasmuch as the art is relatively crowded with respect to these various types of vehicle body panels, it can be appreciated that there is a continuing need for and interest in improvements to such vehicle body panels, and in this respect, the present invention addresses this need and interest.

SUMMARY OF THE INVENTION

In view of the foregoing disadvantages inherent in the known types of vehicle body panels now present in the prior art, the present invention provides an improved vehicle body panel. As such, the general purpose of the present invention, which will be described subsequently in greater detail, is to provide a new and improved vehicle body panel which has all the advantages of the prior art vehicle body panels and none of the disadvantages.

To attain this, a representative embodiment of the concepts of the present invention is illustrated in the drawings and makes use of a vehicle body panel which is utilized to convert the large, rounded rear window of 1984–1989 Chevrolet Corvettes to a flat rear deck configuration. The replacement body panel is preferably formed from a molded fiberglass material and includes a generally horizontal rear deck portion having generally vertical side walls. Rear wheel wells are formed in the side walls and a rear roof portion extends upwardly from the deck. A generally trapezoidal planar rear window is provided in a back wall of the rear roof portion. Apertured flanges are provided on a back end and on rear sidewall bottom edges of the body panel for securement to the original vehicle. A U-shaped strip is formed on a forward edge of the rear roof portion and forms a channel for weatherstripping which forms a seat for engagement with top and side portions of the original vehicle body panels. The original rear valance panel of the vehicle, including the original brake and signal lights, are secured to the rear end of the replacement panel.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the public generally, and especially those who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicle body panel which has all the advantages of the prior art vehicle body panels and none of the disadvantages.

It is another object of the present invention to provide a new and improved vehicle body panel which may be easily and efficiently manufactured and marketed.

It is a further object of the present invention to provide a new and improved vehicle body panel which is of a durable and reliable construction.

An even further object of the present invention is to provide a new and improved vehicle body panel which is susceptible of a low cost of manufacture with regard to both materials and labor, and which accordingly is then susceptible of low prices of sale to the consuming public, thereby making such vehicle body panels economically available to the buying public.

Still yet another object of the present invention is to provide a new and improved vehicle body panel which provides in the apparatuses and methods of the prior art some of the advantages thereof, while simultaneously overcoming some of the disadvantages normally associated therewith.

Still another object of the present invention is to provide a new and improved vehicle body panel adapted for converting the rounded rear window and roof configuration of 1984–1989 Chevrolet Corvettes to a more attractive horizontal rear deck configuration.

Yet another object of the present invention is to provide a new and improved vehicle body panel which allows rounded rear window hatch type vehicle bodies to be converted to a more attractive horizontal rear deck configuration, while utilizing the original vehicle tail lights, rear valance panel, and rear bumper.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
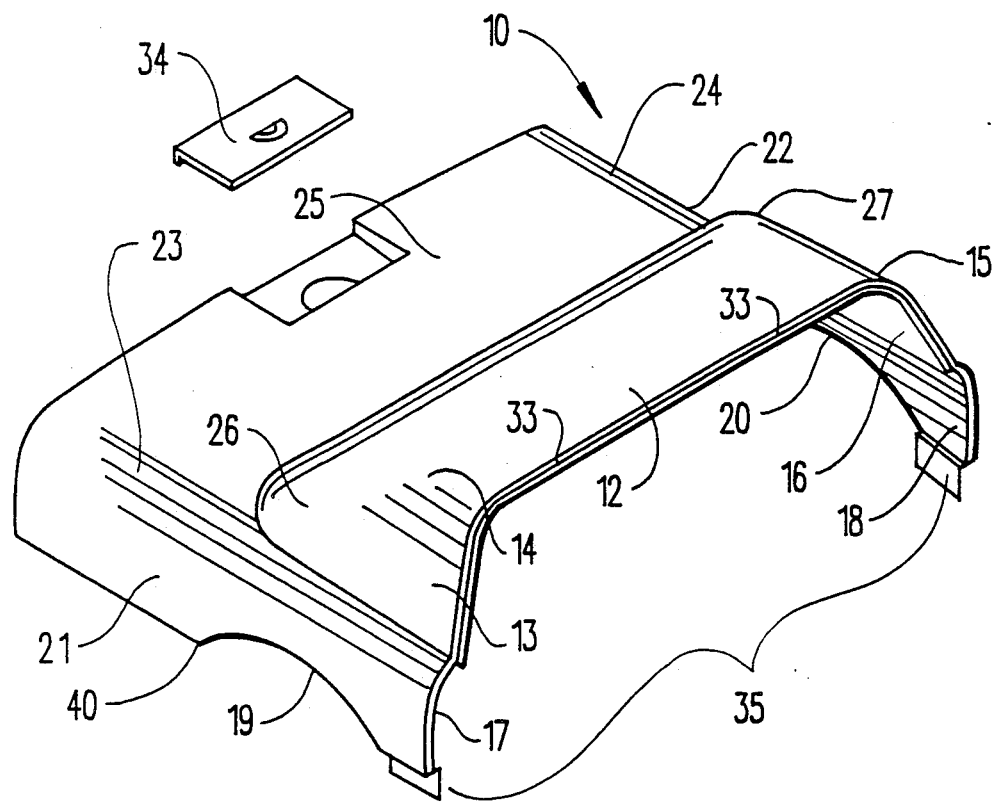
FIG. 1 is a front perspective view of the vehicle body panel according to the present invention.

With reference now to the drawings, and in particular to FIG. 1 thereof, a new and improved vehicle body panel embodying the principles and concepts of the present invention and generally designated by the reference numeral 10 will be described.

More specifically, it will be noted that the first embodiment 10 of the invention includes a rear roof portion 12 having opposite generally vertical side portions 13 and 16. The side portions 13 and 16 are connected with the generally horizontal rear roof portion 12 by smooth radiused curvatures 14 and 15. Forward sidewall portions 17 and 18 are provided with recessed downwardly projecting tabs 35 adapted for securement to side portions of the vehicle and forming mounting surfaces for stock side molding strips. The recessed construction of the tabs 35 allows the stock molding strips to be bolted thereover. The side wall portions 21 and 22 include upper wheel well portions 19 and 20. An apertured securement flange 22' (FIG. 3) extends along a bottom edge of the sidewall portions 21 and 22, terminating at the intersection 40 with respective wheel wells 19 and 20. The horizontal rear deck portion 25 is connected to the side walls 21 and 22 by smooth radiused curvatures 23 and 24. A recessed gas cap well is formed in a central rear portion of the deck 25 and includes a hinged or removable cover 34. A U-shaped strip 33 extends along a forward edge of the rear roof portion 12 and forms a channel for weatherstripping which provides a seat for engagement with top and side portions of the original vehicle body panels.

Figure 2:
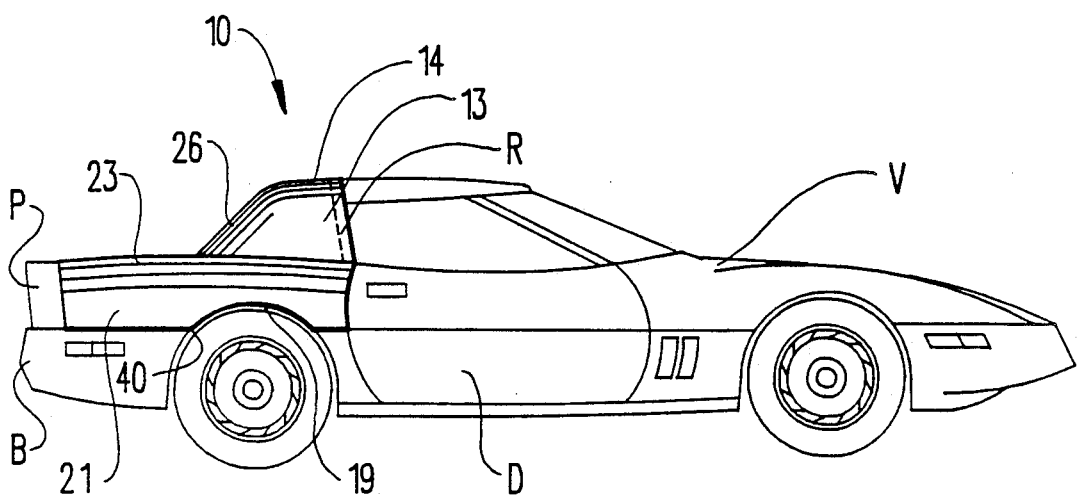
FIG. 2 is a side view of the vehicle body panel of the present invention, as installed on a vehicle.

As shown in FIG. 2, the replacement body panel 10 is installed on a vehicle V, which is preferably a 1984–1989 Chevrolet Corvette. The body panel 10 replaces the original curved rear window of the vehicle, forming a more attractive styling. The body panel 10 may be installed without adversely affecting the structural integrity of the vehicle body. The panel 10 is secured forwardly of the rear valance panel P, which allows the original rear bumper B and vehicle brake and signal lights to be retained. The stock roll bar R is received within the replacement panel 10.

Figure 3:
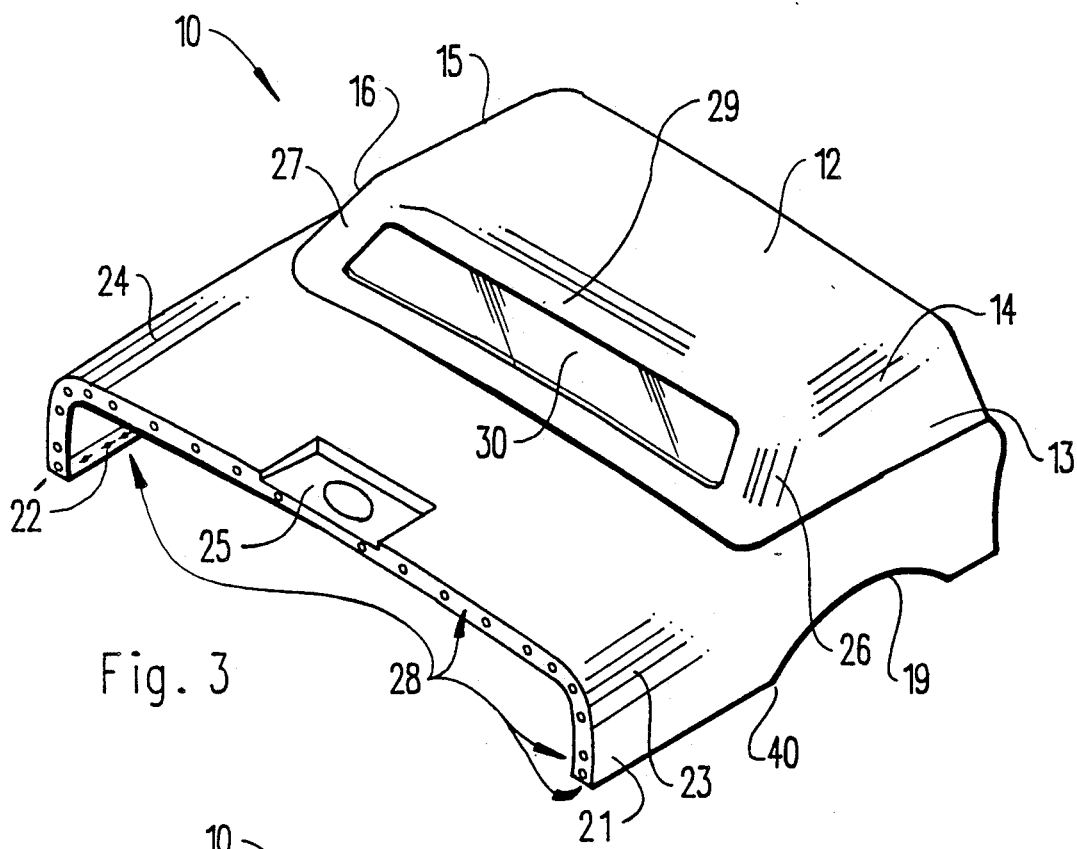
FIG. 3 is a rear perspective view of the vehicle body panel of the present invention.

As shown in FIG. 3, an apertured flange 28 is provided on a rear end of the body panel 10. The apertured flange 28 is secured to the original rear valance panel P as shown in FIG. 2. The rear roof portion 12 includes an inclined back wall 29 which is connected to the side wall portions 13 and 16 by radiused corners 26 and 27. A generally trapezoidal planar window 30 is provided in the back wall 29.

Figure 4:
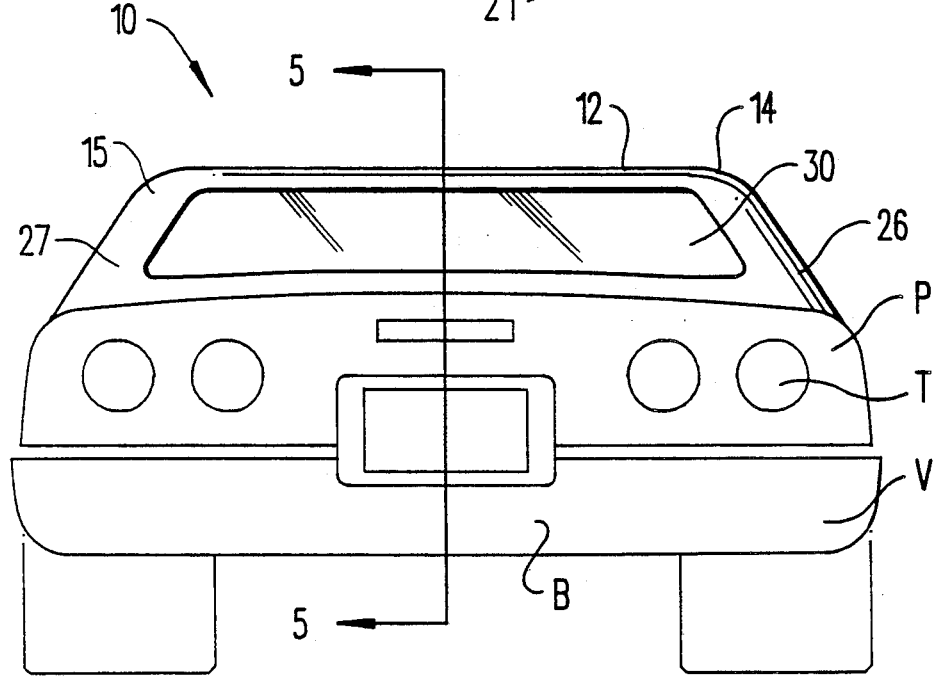
FIG. 4 is a rear end view of the vehicle body panel of the present invention, installed on a vehicle.

FIG. 4 is a rear end view of the vehicle V with the panel 10 installed. The body panel 10 produces an attractive European styling, which eliminates the economy car look of the original curved rear window hatch type configuration. The original rear bumper B and original turn and tail lights T are retained, along with the valance panel P.

Figure 5:
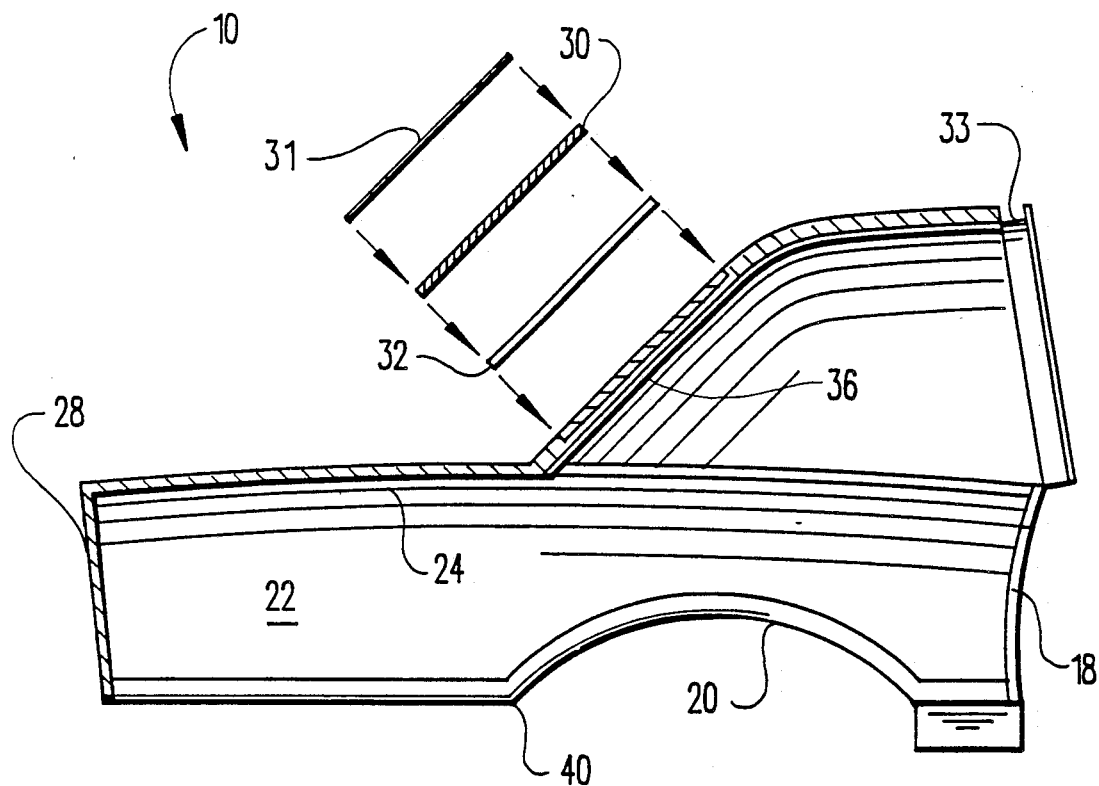
FIG. 5 is a cross sectional view, taken along line 5-5 of FIG. 4.

FIG. 5 is a cross sectional view, which further illustrates the construction of the replacement body panel 10. The replacement body panel 10 is preferably formed from a molded fiberglass material, which may be suitably painted to match the original vehicle color. Stock G.M. window molding 31 is received around the rear window 30. The window 30 is secured within a groove 36 by adhesive 32.

Figure 6:
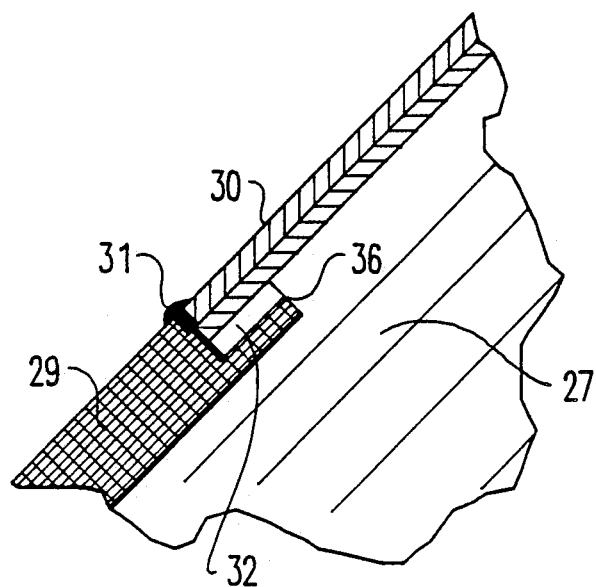
FIG. 6 is partial cross sectional detail view, illustrating the window mounting details of the vehicle body panel of the present invention.

FIG. 6 further illustrates the mounting of the window 30 in the panel 29.

As may now be understood, the present invention provides a replacement vehicle body panel and method of installation which allows a curved rear window hatch type original equipment vehicle body to be inexpensively converted to a more attractive horizontal rear deck configuration, while utilizing the original conventional rear bumper, tail lights, and without degrading the structural integrity of the vehicle.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A vehicle body panel, comprising:
    a generally horizontal rear deck portion;
    a rear roof portion extending substantially vertically upwardly from said rear deck portion;
    opposite generally vertical side walls extending downwardly from opposite sides of said rear deck portion and said rear roof portion;
    rear wheel wells formed in said side walls;
    a rear window in a back, upwardly extending wall of said rear roof portion;
    a first apertured flange formed along a rear end portion of said rear deck portion and said vertical side walls; and
    second and third apertured flanges formed on opposite bottom rear portions of said vertical side walls.

2. The vehicle body panel of claim 1, wherein said second and third flanges terminate at an intersection of said rear side portions with respective opposite rear wheel wells.

3. The vehicle body panel of claim 1, further comprising a pair of recessed attaching tabs on forward bottom side portions of said body panel.

4. A method of reconfiguring a vehicle body, comprising the steps of:
    providing a vehicle body panel, said vehicle body panel including a generally horizontal rear deck portion, a rear roof portion extending substantially vertically upwardly from said rear deck portion, opposite generally vertical side walls extending downwardly from opposite sides of said rear deck portion and said rear roof portion, rear wheel wells formed in said wide walls, a rear window in a back, upwardly extending wall of said rear roof portion, a first apertured flange formed along a rear end portion of said rear deck portion and said vertical side walls, and second and third apertured flanges formed on opposite bottom rear portions of said vertical side walls;
    removing an original rear roof and rear hatch portion of a vehicle; and
    securing said vehicle body panel utilizing fasteners through said first, second and third aperture flanges.

5. The method of claim 4, wherein said second and third flanges terminate at an intersection of said rear side portions with respective opposite rear wheel wells.

6. The method of claim 4, wherein said vehicle body includes a pair of recessed attaching tabs on forward bottom side portions of said body panel, and further comprising the steps of:
    securing said tabs to respective opposite side walls of a vehicle; and
    securing side molding strips over each of said recessed tabs.

7. The method of claim 4, further comprising the step of securing an original rear valance panel of said vehicle body to said first apertured flange on said vehicle body panel.

8. The method of claim 4, further comprising the steps of:
    providing a U-shaped edge extending across a forward edge of said rear roof portion, forming a channel;
    securing a resilient weather strip in said channel; and
    aligning said U-shaped edge with top and sidewall portions of said vehicle.

* * * * *